United States Patent
Tang et al.

(10) Patent No.: US 9,977,275 B2
(45) Date of Patent: May 22, 2018

(54) FILTER MODULE COMPRISING FIRST AND SECOND CONDUCTIVE PATTERNS EMBEDDED IN A PATTERNED GROOVED SURFACE OF A COATING LAYER AND TOUCH SCREEN HAVING THE SAME

(71) Applicant: Nanchang O-film Optical Display Technology Co., Ltd., Nanchang, Jiangxi (CN)

(72) Inventors: Genchu Tang, Guangdong (CN); Shengcai Dong, Guangdong (CN); Wei Liu, Guangdong (CN); Bin Tang, Guangdong (CN); Shilei He, Guangdong (CN)

(73) Assignee: NANCHANG O-FILM TECH. CO., LTD., Nanchang, Jiangxi (CN)

( * ) Notice: Subject to any disclaimer, the term of this patent is extended or adjusted under 35 U.S.C. 154(b) by 0 days. days.

(21) Appl. No.: 15/223,368

(22) Filed: Jul. 29, 2016

(65) Prior Publication Data
US 2016/0334661 A1 Nov. 17, 2016

Related U.S. Application Data

(62) Division of application No. 14/229,180, filed on Mar. 28, 2014.

(30) Foreign Application Priority Data

Mar. 30, 2013 (CN) .......................... 2013 1 0115431

(51) Int. Cl.
G02F 1/1333 (2006.01)
G06F 3/041 (2006.01)
G02F 1/1335 (2006.01)

(52) U.S. Cl.
CPC .... *G02F 1/13338* (2013.01); *G02F 1/133512* (2013.01); *G02F 1/133514* (2013.01);
(Continued)

(58) Field of Classification Search
CPC ............. G06F 2203/04111; G06F 2203/04107
See application file for complete search history.

(56) References Cited

U.S. PATENT DOCUMENTS

2009/0122223 A1 5/2009 Hayano
2009/0213096 A1* 8/2009 Kuo ....................... G06F 3/044
345/176

(Continued)

FOREIGN PATENT DOCUMENTS

CN 101403830 A 4/2009
KR 2011-0103730 A 9/2011
(Continued)

*Primary Examiner* — Paul Lee
(74) *Attorney, Agent, or Firm* — Muncy, Geissler, Olds & Lowe, P.C.

(57) ABSTRACT

The present disclosure relates to a filter module and a touch screen having the filter module. The filter module includes a substrate, the substrate includes a first surface and a second surface opposite to the first surface, the first surface is provided with a shielding matrix and a color resister distributed in the shielding matrix, the shielding matrix includes intersecting grid lines, the grid lines intersect to form grids, the color resister is formed in the grids, the second surface is provided with a conductive layer, the conductive layer comprises a first conductive pattern and a second conductive pattern, the first conductive pattern and the second conductive pattern are spaced apart from each other to form a sensing structure, the conductive layer is coated with a coating layer.

21 Claims, 9 Drawing Sheets

(52) U.S. Cl.
CPC .... *G06F 3/041* (2013.01); *G06F 2203/04103* (2013.01); *G06F 2203/04107* (2013.01); *G06F 2203/04111* (2013.01); *G06F 2203/04112* (2013.01)

(56) References Cited

U.S. PATENT DOCUMENTS

| | | | |
|---|---|---|---|
| 2009/0278810 A1* | 11/2009 | Ma | G06F 3/0412 345/173 |
| 2010/0164881 A1* | 7/2010 | Kuo | G02F 1/133512 345/173 |
| 2011/0096017 A1 | 4/2011 | Li | |
| 2011/0102361 A1* | 5/2011 | Philipp | G06F 3/044 345/174 |
| 2012/0075218 A1* | 3/2012 | Lin | G06F 3/0418 345/173 |
| 2012/0154323 A1 | 6/2012 | Nambu | |
| 2012/0268701 A1* | 10/2012 | Nemoto | G06F 3/0412 349/106 |

FOREIGN PATENT DOCUMENTS

| | | |
|---|---|---|
| KR | 2012-0049428 A | 5/2012 |
| KR | 2012-0121573 A | 11/2012 |

\* cited by examiner

FIG. 11d though understanding of and enabling description for these
FILTER MODULE COMPRISING FIRST AND SECOND CONDUCTIVE PATTERNS EMBEDDED IN A PATTERNED GROOVED SURFACE OF A COATING LAYER AND TOUCH SCREEN HAVING THE SAME

CROSS REFERENCE TO RELATED APPLICATIONS

This application is a divisional application of U.S. application Ser. No. 14/229,180 filed Mar. 28, 2014, the contents of which are incorporated herein by reference.

FIELD OF THE INVENTION

The present disclosure relates to electronic technologies, and more particularly relates to a filter module and a touch screen having the filter module.

BACKGROUND OF THE INVENTION

A touch panel is a sensing device capable of receiving touch input signals. The touch panel brings a new appearance for information exchange, which is a new appealing information interactive device. The development of touch panel technology has aroused widespread concern from information media at home and abroad; and the touch panel technology has become a booming high-tech industry in the optoelectronics.

Currently, a touch screen usually includes a display screen and a touch panel located on the display screen. However, as an independent component from the display screen, when the touch panel is used in electronic products which have achieved human-machine interaction, the touch panel needs to be ordered according to a size of the display screen, and then it is assembled. Currently, there are mainly two different ways for the assembly of the touch panel and the display screen, i.e. a frame attach and a full attach, the frame attach is to attach the edge of the touch panel to the edge of the display screen, the full attach is to attach an entire lower surface of the touch panel to an entire upper surface of the display screen.

As an assembly module of a polarizer, a filter module, a Liquid Crystal Display (LCD) module, and a Thin Film Transistor (TFT) module, the touch panel has a great thickness which is difficult to be reduced. As a component independent on the display screen, the touch panel needs a complex assembly process and this will increase the thickness and the weight of the electronic products in the assembly of the touch screen; moreover, one more assembly process would lead to an increase of the probability of undesired products and the manufacturing cost.

SUMMARY OF THE INVENTION

The present disclosure is directed to provide a filter module with smaller thickness and touch screen having the filter module.

A filter module includes: a substrate, which includes a first surface and a second surface opposite to the first surface. The first surface is provided with a shielding matrix and a color resister distributed in the shielding matrix. The shielding matrix includes intersecting grid lines. The grid lines intersect to form grids, the color resister is formed in the grids, the second surface is provided with a conductive layer, the conductive layer includes a first conductive pattern and a second conductive pattern, the first conductive pattern and the second conductive pattern are spaced apart from each other to form a sensing structure, the conductive layer is coated with a coating layer.

A touch screen includes a TFT electrode plate, a LCD module, the filter module mentioned above, and a polarizer, which are laminated sequentially.

The above filter module can achieve a touch operation and a filtering function at the same time. When it is used in a touch screen, the touch screen will have a touch function, it is not necessary to assemble another touch panel on the touch screen, thus a thickness of the touch screen can be reduced, and the cost is saved.

BRIEF DESCRIPTION OF THE DRAWINGS

The components in the drawings are not necessarily drawn to scale, the emphasis instead being placed upon clearly illustrating the principles of the present disclosure. The following drawings provide specific details for a thorough understanding of and enabling description for these embodiments.

DETAILED DESCRIPTION OF THE EMBODIMENTS

Illustrative embodiments of the disclosure are described below. The following explanation provides specific details for a thorough understanding of and enabling description for these embodiments. One skilled in the art will understand that the disclosure may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figure 1:
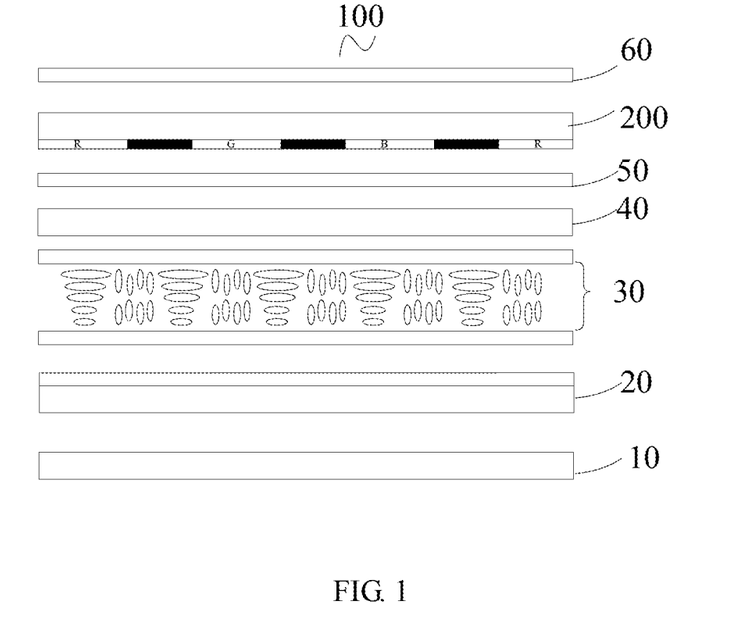
FIG. 1 is a schematic view of an embodiment of a touch screen.

Referring to FIG. 1, an embodiment of a touch screen 100 includes a lower polarizer 10, a TFT electrode plate 20, a LCD module 30, a common electrode plate 40, a protective film 50, a filter module 200, and an upper polarizer 60, which are laminated sequentially.

It is to be understood that, the present embodiment is an LCD display with direct type or lateral type light source. In another embodiment, which is equipped with a backlight of a polarized light source, such as an OLED polarized light source, the lower polarizer 10 can be omitted as long as the upper polarizer 60 is provided.

Figure 2:
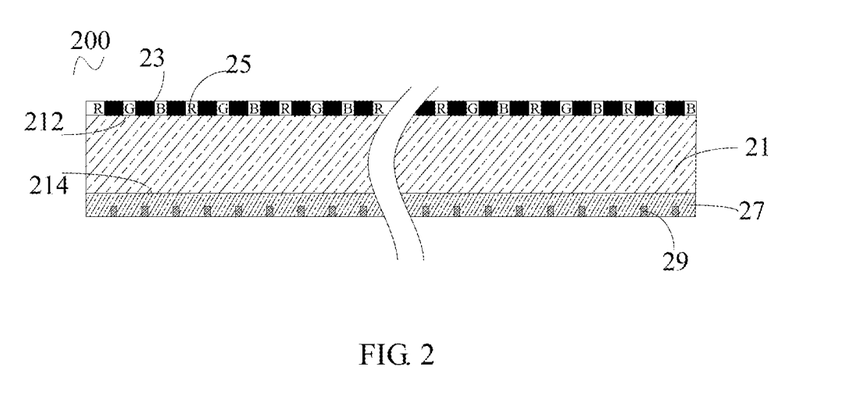
FIG. 2 is a cross-sectional view of a filter module of FIG. 1.

In one embodiment, referring to FIG. 2, the filter module 200 includes a substrate 21, a shielding matrix 23, a color resister 25, a coating layer 27, and a conductive layer 29.

Figure 3:
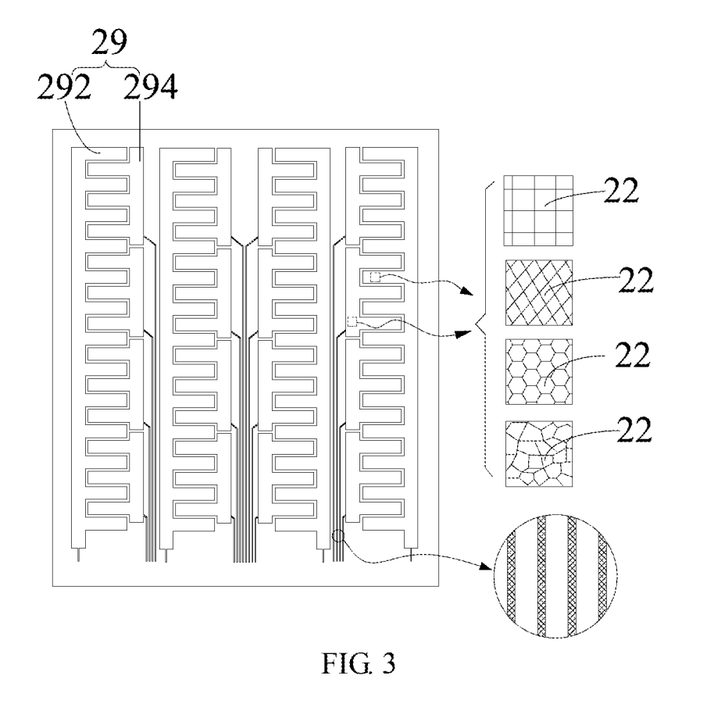
FIG. 3 is a top plan view of an embodiment of the conductive layer.

The substrate 21 is generally a glass or a transparent film. The substrate 21 includes a first surface 212 and a second surface 214 opposite to each other. The shielding matrix 23 is located on the first surface 212. The shielding matrix 23 is a micro grid formed by opaque ink, opaque resin or shielding coating. The grid includes perpendicularly intersected grid lines. The color resister 25 is located in each micro grid and usually a red (R) color resister, a green (G) color resister or a blue (B) color resister. The color resister 25 is used to transform an incident light into a monochromatic light. The coating layer 27 and the conductive layer 29 embedded in the coating layer 27 are located on the second surface 214. Referring to FIG. 3, the conductive layer 29 includes first conductive patterns 292 and second conductive patterns 294. The conductive layer 29 is formed by nano-imprinting process, mainly shown as a conductive mesh composed by conductive wires 22 formed by a conductive material received in a groove on a surface of the coating layer 27. The conductive material can be metal, carbon nano tube, graphene, conductive organic polymer, or ITO, preferably nano silver paste. The first conductive patterns 292 and the second conductive patterns 294 are spaced apart in an extended direction of the coating layer 27 to form a sensing structure.

In one embodiment, the conductive wires 22 and grid lines of the shielding matrix 23 are not aligned. In order to ensure the light transmittance of the filter module 200 and the color rendering property of the display screen, a width of each of the conductive wires 22 of the conductive mesh is in a range of from 500 nm to 5 μm, which makes the conductive mesh to be visually transparent.

The coating layer 27 defines patterned grooves in a side thereof away from the substrate 21. The first conductive patterns 292 and the second conductive patterns 294 are embedded in the groove. The thicknesses of the first conductive patterns 292 and the second conductive patterns 294 are not greater than a depth of the grooves.

In one embodiment, referring to FIG. 3, the first conductive patterns 292 and the second conductive patterns 294 with the forgoing imprinted structure can be single layer and multipoint structure. A plurality of spaced second conductive patterns 294 are arranged on one side of each of the first conductive patterns 292. The second conductive patterns 294 on both sides of each first conductive pattern 292 are insulated from each other. Meshes to structure the first conductive patterns 292 and the second conductive patterns 294 can be regular-shaped meshes or random-shaped meshes. The first conductive patterns 292 and the second conductive patterns 294 are correspondingly connected to traces which lead to an edge of the coating layer 27. The traces can be solid wires and can also be structured with meshed wires. When the traces are solid wires, the traces and the grid lines of the shielding matrix 23 are aligned. When the traces are meshed wires, the traces and the grid lines of the shielding matrix 23 may be aligned or not. When the traces and the grid lines of the shielding matrix 23 are not aligned, the wire width is in a range from 500 nm to 5 μm, so as to ensure visual transparency.

Referring to FIG. 4a to FIG. 4d, a manufacturing method of the first conductive patterns 292, the second conductive patterns 294, and the traces includes following steps.

Figure 4A:
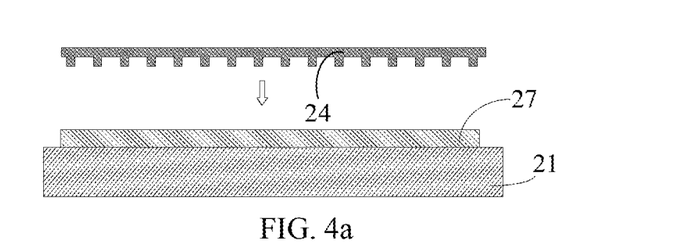
FIG. 4a to FIG. 4d are cross-sectional views showing a manufacturing process of the conductive layer.

Step one, referring to FIG. 4a, a substrate 21 is provided; the coating layer 27 is formed on a surface of the substrate 21.

Figure 4B:
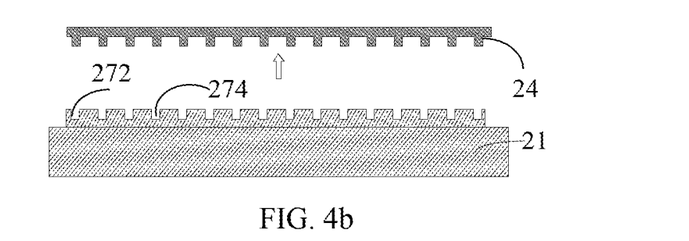

Step two, referring to FIG. 4b, a first groove 272 and a second groove 274 are defined in the coating layer 27 by imprinting the coating layer 27 using an imprinted mold 24.

Figure 4C:
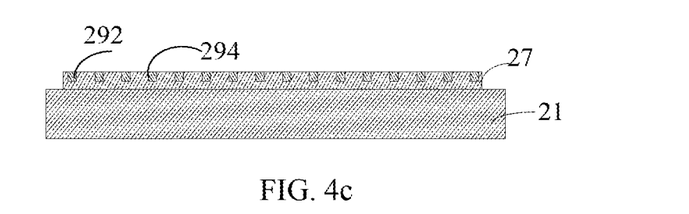

Step three, referring to FIG. 4c, the first grooves 272 and the second grooves 274 are filled with conductive material and then the conductive material is cured to form the first conductive patterns 292 and the second conductive patterns 294.

Figure 4D:
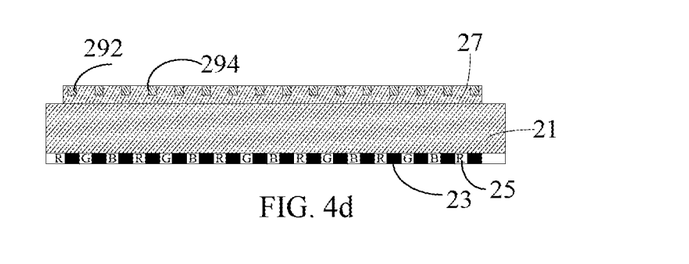

Step four, referring to FIG. 4d, the color resistor 25 and the shielding matrix 23 are formed on a surface of the substrate 21 opposite to the coating layer 27.

Figure 5:
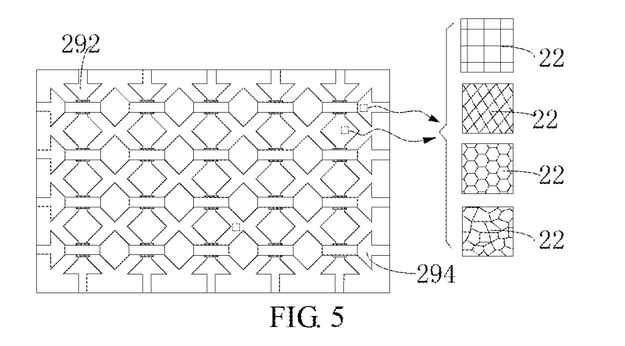
FIG. 5 is a schematic view of another embodiment of the conductive layer.
Figure 6:
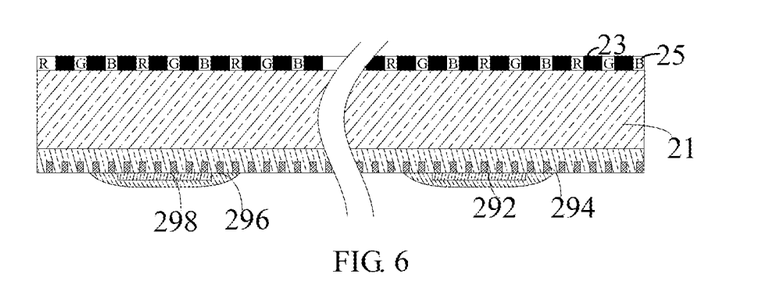
FIG. 6 is a cross-sectional view of an embodiment of the filter module.

In one embodiment, referring to FIG. 5, the first conductive patterns 292 and the second conductive patterns 294 having the imprinted structure can also be patterns of bridge structures. The conductive layer 29 further include conductive bridges 296, each of which is located over corresponding one of the first conductive patterns 292 to connect both second conductive patterns 294 located on opposite sides of the first conductive pattern 292. The insulating layers 298 are formed between the conductive bridges 296 and the corresponding first conductive patterns 292. Referring to FIG. 6, the insulating layers 298 and the conductive bridges 296 can be formed by subsequently inkjet printing transparent insulating material and conductive material on the first conductive patterns 292 and the second conductive patterns 294.

Figure 7:
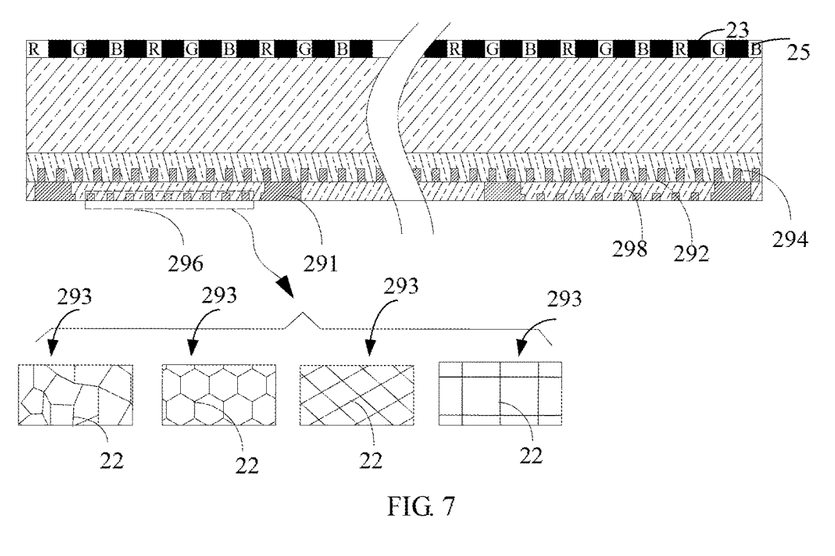
FIG. 7 is a cross-sectional view of another embodiment of the filter module.

The conductive bridges 296 can be embedded in the coating layer 27. In one embodiment, referring to FIG. 7, the conductive bridge 296 is formed by one-step imprinting process. In alternative embodiments, plug holes for receiving conductive blocks 291 are formed by a lithography exposure process, and then a grid-like groove is formed by an imprinting process, finally, the conductive bridges 296 are formed by filling conductive materials in the plug hole and the groove. The conductive blocks 291 connect at least two conductive wires of the corresponding second conductive patterns 294, if one conductive wire is disconnected, the other one can also be connected, such that an effectiveness of an electrical connection can be ensured.

Figure 8:
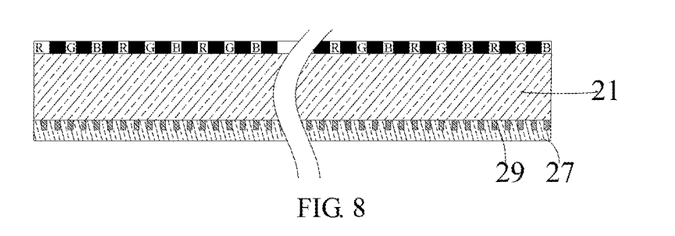
FIG. 8 is a cross-sectional view of another embodiment of the filter module.

In one embodiment, the conductive mesh is formed by etching a metal coating layer attached to the substrate 21, then the coating layer 27 is formed on the conductive mesh. In the imprinting structure, the first conductive patterns 292 and the second conductive patterns 294 are embedded in one side of the coating layer 27 away from the substrate 21. In the illustrated embodiment, referring to FIG. 8, the first conductive patterns 292 and the second conductive patterns 294 are embedded in one side of the coating layer 27 facing the substrate 21.

Referring to FIG. 9a to FIG. 9e, a manufacturing method of the conductive mesh of the above structure includes following steps.

Figure 9A:
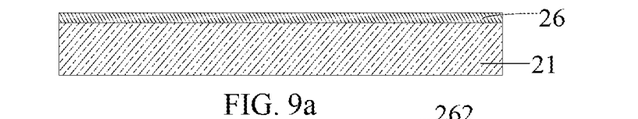
FIG. 9a to FIG. 9e are cross-sectional views of an embodiment showing a manufacturing process of the conductive mesh.
Figure 9B:
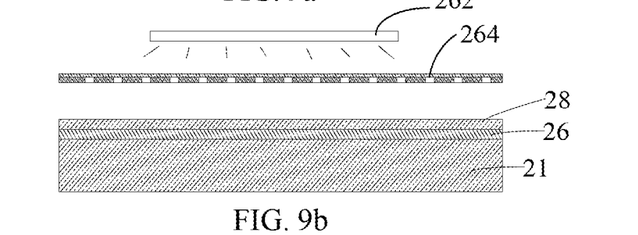
Figure 9C:
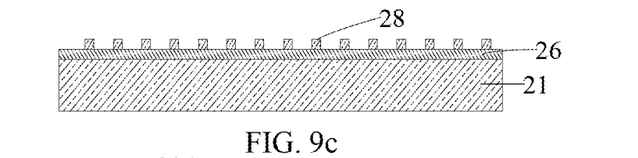
Figure 9D:
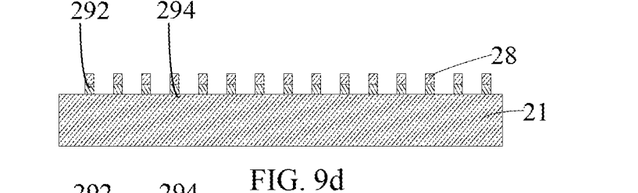
Figure 9E:
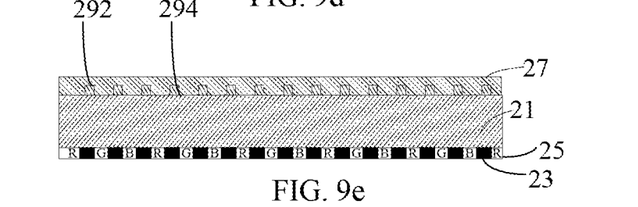

Step one, referring to FIG. 9a, the substrate 21 is provided, a metal layer 26 is formed on the substrate 21;

Step two, a photoresist layer 28 is formed on the metal layer 26, the photoresist layer 28 is exposed using a light source 262 and a mask 264;

Step three, the photoresist layer 28 is developed on a surface of the metal layer 26;

Step four, the first conductive patterns 292 and the second conductive patterns 294 are formed by etching the metal layer 26 according to the developed photoresist layer 28;

Step five, the photoresist layer 28 is removed, and a coating layer 27 is formed on the substrate 21 covering the first conductive pattern 292 and the second conductive pattern 294. A color resister 25 and a shielding matrix 23 are formed on a surface of the substrate 21 opposite to the first conductive pattern 292 and the second conductive pattern 294.

Figure 10:
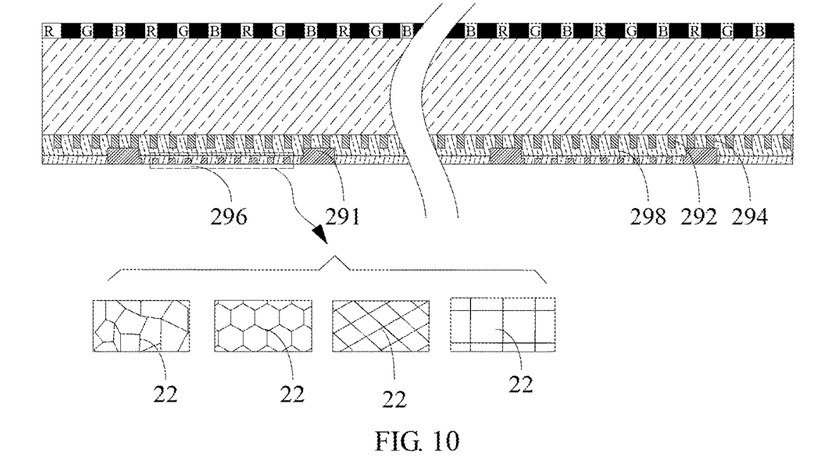
FIG. 10 is a cross-sectional view of an embodiment of a filter module.

The first conductive patterns 292 and the second conductive patterns 294 formed by a coating layer metal can also be used in the single layer multipoint structure and the bridge structure. In one embodiment, referring to FIG. 10, the conductive bridge 296 is embedded in the coating layer 27, the conductive bridge 296 and the first conductive pattern 292 are spaced apart from each other in a thickness direction of the coating layer 27, a part of the coating layer 27 located between the conductive bridge 296 and the conductive layer 29 forms an insulating layer 298, the conductive block 291 connects at least two conductive wires of the corresponding second conductive pattern 294.

In one embodiment, referring to FIG. 11a to FIG. 11d, the conductive wire 22 of the first conductive pattern 292 and the second conductive pattern 294 is aligned with the grid line of the shielding matrix 23, and a projection of the conductive wire 22 on a surface of a opaque resin or a opaque ink superposes exactly the grid line. The conductive wire 22 is shielded by the opaque resin or the opaque ink, thus the transparency of the filter module 200 may not be affected, and the color rendering property of the display screen can be assured. Furthermore, a thickness of the conductive wire 22 is not required to be visually transparent, as long as a thickness of the conductive wire 22 is less than a thickness of an opaque resin border or opaque ink border.

Figure 11A:
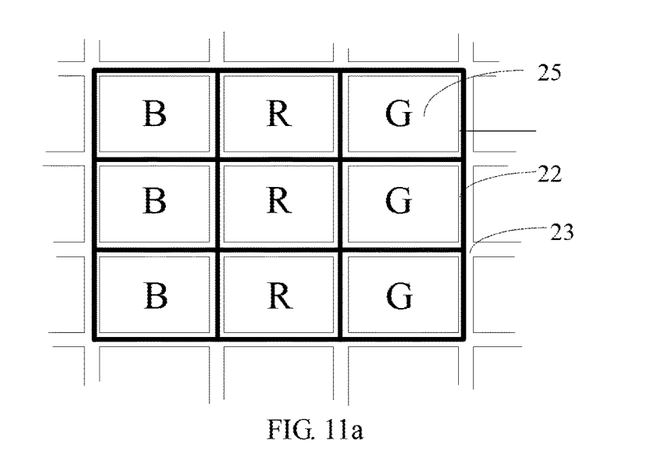
FIG. 11a is a schematic view of an embodiment of a conductive wire.
Figure 11B:
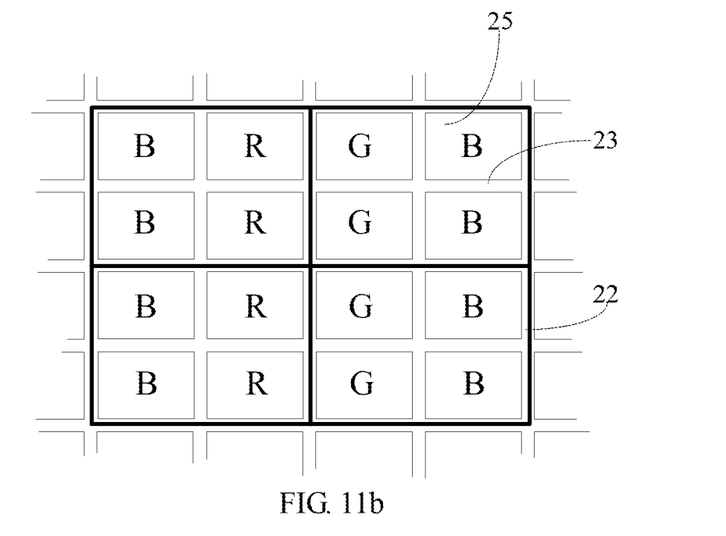
FIG. 11b is a schematic view of another embodiment of a conductive wire.

In one embodiment, referring to FIG. 11a, the conductive mesh has a shape of a rectangular; a mesh cell of each conductive mesh is aligned to a grid of the shielding matrix 23. In another embodiment, referring to FIG. 11b, a mesh cell of each mesh is aligned to a plurality of grids on the shielding matrix.

Figure 11C:
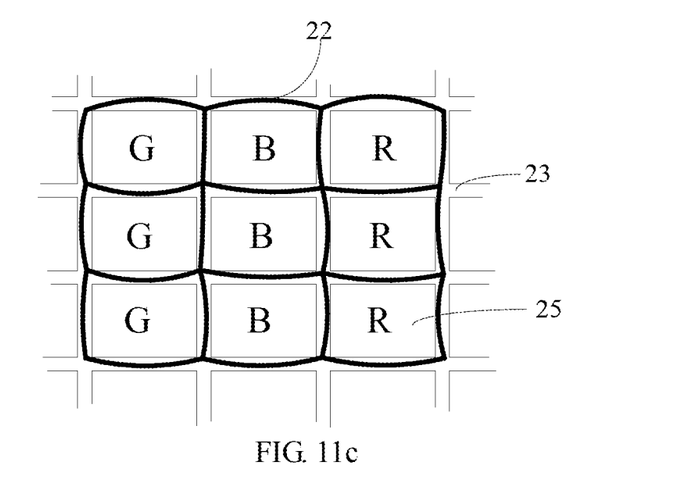
FIG. 11c is a schematic view of yet another embodiment of a conductive wire.
Figure 11D:
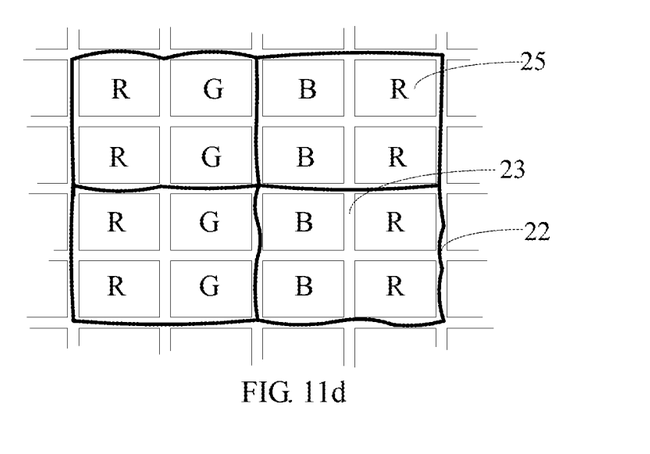
FIG. 11d is a schematic view of yet another embodiment of a conductive wire.

In one embodiment, referring to FIG. 11c and FIG. 11d, the conductive mesh wire is not necessarily to be straight lines, it can also be curve or broken wires, i.e. the mesh cell of the conductive mesh can have an irregular shape, as long as the conductive wire is shielded by the opaque resin or opaque ink. Similarly, a mesh cell of each conductive mesh is aligned to a plurality of filter cell meshes on the shielding matrix, a mesh line or a broken line is used to adjust the surface resistance of the conductive pattern conveniently.

The illustrated embodiments of the touch screen 100 have following advantages:

(1) The filter module can achieve a touch operation function and a filtering function at the same time, as an indispensable component of the display screen, when the filter module is used in the touch screen, the touch screen has a touch function, no touch panel is needed to be assembled on the touch screen, a thickness of the electronic product can thus be reduced, the material and the assembling cost can also be saved.

(2) The touch conductive patterns are formed by conductive meshes; the visual transparency is achieved by controlling a thickness and a width of the mesh wire. When the conductive pattern is made of metal, a resistance of the touch screen is reduced, thus an energy consumption of the touch screen can be reduced.

(3) The mesh of the conductive pattern can be formed at one time by patterned imprinting. A patterned etching process (filming-exposing-developing-etching) is performed by an imprinting mold, each conductive pattern can be formed by one imprinting process, mesh shape and pattern can be formed at one time, there is no need to pattern etch each conductive pattern, a manufacturing process is greatly simplified. Furthermore, after the patterned imprinting process, rather than forming an entire surface of the substrate and then etching the substrate, conductive materials are filled in the imprinted groove carefully. Thus a lot of conductive materials can be saved, especially when an expensive material such as ITO is used.

(4) The electrode traces of the conductive pattern are mesh structures, it is convenient to scrape the material when the conductive material is filled, thus the conductive material is easy to be retained and not to be scraped away. Besides, during sintering, the nano-silver paste, spread ball will not be produced by condensation, thus the second conductive wire will not be broken.

(5) The projection of the conductive wire on a surface of the opaque resin or opaque ink superposes the grid line of the shielding matrix, and the conductive wire is shielded by the opaque resin or opaque ink, such that the light transmittance of the touch screen will not be affected, the thickness of the conductive wire is not required to be visually transparent, as long as a thickness of the conductive wire is less than a thickness of a border wire of the opaque resin or opaque ink, a requirement of a molding process of the conductive mesh can be greatly reduced, the cost thus can be reduced.

Although the present disclosure has been described with reference to the embodiments thereof and the best modes for carrying out the present disclosure, it is apparent to those skilled in the art that a variety of modifications and changes may be made without departing from the scope of the present disclosure, which is intended to be defined by the appended claims.

What is claimed is:

1. A filter module, comprising:
   a substrate, comprising a first surface and a second surface opposite to the first surface, wherein the first surface is provided with a shielding matrix and a color resister distributed in the shielding matrix, the shielding matrix comprises intersecting grid lines, the grid lines intersect with each other to form square grids, the color resister is received in the grids; and
   a conductive layer located on the second surface, wherein the conductive layer comprises first conductive patterns and second conductive patterns, the first conductive patterns and the second conductive patterns are spaced apart from each other to form a sensing structure, the conductive layer is coated with a coating layer;

wherein the first conductive patterns and the second conductive patterns are formed by etching a metal layer attached to the second surface of the substrate, wherein the coating layer defines a patterned grooved surface on a side of the coating layer adjacent to the second surface, the first conductive patterns and the second conductive patterns being embedded in the patterned grooved surface, wherein extensions of the coating layer, between grooves of the patterned grooved surface, extend toward the second surface of the substrate, and the extensions extend towards a Liquid Crystal Display (LCD) layer or a Thin Film Transistor (TFT) layer.

2. The filter module according to claim 1, wherein the first conductive patterns and the second conductive patterns comprise conductive meshes, the conductive meshes are formed with intersected conductive wires.

3. The filter module according to claim 2, wherein a projection of the conductive wires on the shielding matrix superposes the grid lines of the shielding matrix.

4. The filter module according to claim 3, wherein a mesh cell of the first or second conductive patterns is aligned to one of the square grids of the shielding matrix.

5. The filter module according to claim 3, wherein a mesh cell of the first or second conductive patterns is aligned to a plurality of grids of the shielding matrix.

6. The filter module according to claim 2, wherein a width of each of the conductive wires of the conductive layer is less than a width of the grid lines of the shielding matrix.

7. The filter module according to claim 2, wherein the conductive wires are curve or broken wires.

8. The filter module according to claim 2, wherein the conductive wire are made of metal.

9. The filter module according to claim 2, wherein the width of the conductive wires is in the range from 500 nm to 5 µm.

10. The filter module according to claim 1, wherein a plurality of second conductive patterns are arranged along one side of each of the first conductive patterns, and teeth of the plurality of second conductive patterns mesh with the teeth of a corresponding one of the first conductive patterns.

11. The filter module according to claim 1, wherein thicknesses of the first conductive patterns and the second conductive patterns are less than or equal to the depth of the groove.

12. The filter module according to claim 1, wherein the coating layer is a metal coating layer is made of at least one metal selected from a group consisting of silver, copper, zinc, gold, and nickel.

13. The filter module according to claim 12, wherein at least two spaced second conductive patterns are arranged on one side of each of the first conductive patterns, the second conductive patterns on both sides of the first conductive pattern are insulated.

14. A filter module, comprising:
a substrate, comprising a first surface and a second surface opposite to the first surface, wherein the first surface is provided with a shielding matrix and a color resister distributed in the shielding matrix, the shielding matrix comprises intersecting grid lines, the grid lines intersect with each other to form grids, the color resister is received in the grids; and
a conductive layer located on the second surface, wherein the conductive layer comprises first conductive patterns and second conductive patterns, the first conductive patterns and the second conductive patterns are spaced apart from each other to form a sensing structure, the conductive layer is coated with a coating layer;
a plurality of conductive bridges embedded in the coating layer, wherein each of the conductive bridges comprises a mesh portion composed of the conductive wires, the mesh portion and the first conductive patterns are spaced apart along a direction of the thickness of the coating layer, a part of the coating layer located between the conductive bridge and the first conductive patterns forms an insulating layer,
wherein the first conductive patterns and the second conductive patterns are formed by etching a metal layer attached to the second surface of the substrate, the coating layer defines patterned grooves on a side of the coating layer adjacent to the second surface, the first conductive patterns and the second conductive patterns are embedded in the patterned grooves.

15. The filter module according to claim 14, wherein the conductive bridge further comprising two conductive blocks located on both ends of the mesh portion, the mesh portion are formed by intersecting of the conductive wires, the conductive block extends from an end of the mesh portion to the second conductive patterns and is electrically connected to the second conductive patterns.

16. The filter module according to claim 15, wherein the conductive wires of the conductive bridge and the grid lines of the shielding matrix are aligned.

17. The filter module according claim 15, wherein the conductive block and the grid lines of the shielding matrix are aligned.

18. The filter module according to claim 15, wherein the conductive block connects at least two conductive wires of the second conductive pattern.

19. A touch screen, comprising a TFT electrode plate, a LCD module, the filter module according to claim 1, and a polarizer, which are laminated sequentially.

20. The filter module according to claim 1, wherein the first surface of the substrate, having the shielding matrix, is disposed closer to the TFT layer or LCD layer than the second surface, having the coating layer.

21. The filter module according to claim 1, wherein the shielding matrix and the color resister are disposed in a same plane on the first surface opposite the second surface.

* * * * *